US007767743B2

(12) United States Patent
Weng et al.

(10) Patent No.: US 7,767,743 B2
(45) Date of Patent: Aug. 3, 2010

(54) PROCESSABLE BRANCHED ISOOLEFIN-ALKYLSTYRENE ELASTOMERS

(75) Inventors: Weiqing Weng, Houston, TX (US); David Y. Chung, Bellaire, TX (US); Anthony Jay Dias, Houston, TX (US); Yuan-Ju (Ray) Chen, Torrence, TX (US); Alan A. Galuska, Glen Gardener, NJ (US); James R. Ayers, Highlands, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 916 days.

(21) Appl. No.: 11/373,783

(22) Filed: Mar. 10, 2006

(65) Prior Publication Data

US 2007/0213444 A1 Sep. 13, 2007

(51) Int. Cl.
*C08K 5/09* (2006.01)
(52) U.S. Cl. .................. 524/394; 524/348.7; 524/346; 524/445; 524/425; 524/493; 524/449; 524/431; 524/451; 524/432
(58) Field of Classification Search .............. 524/394, 524/348.7, 346, 445, 425, 493, 449, 431, 524/451, 432
See application file for complete search history.

(56) References Cited

U.S. PATENT DOCUMENTS

| | | | |
|---|---|---|---|
| 2,734,047 A | 2/1956 | Smith et al. | |
| 2,926,718 A | 3/1960 | Baldwin et al. | |
| 2,944,578 A | 7/1960 | Baldwin et al. | |
| 4,074,035 A | 2/1978 | Powers et al. | |
| 4,245,060 A | 1/1981 | Powers et al. | |
| 4,395,506 A | 7/1983 | Nagano et al. | |
| 4,472,538 A | 9/1984 | Kamigaito et al. | |
| 4,632,963 A | 12/1986 | Gardner et al. | |
| 4,703,091 A | 10/1987 | Gardner et al. | |
| 4,810,734 A | 3/1989 | Kawasumi et al. | |
| 4,889,885 A | 12/1989 | Usuki et al. | |
| 5,162,445 A | 11/1992 | Powers et al. | |
| 5,548,029 A | 8/1996 | Powers et al. | |
| 5,886,106 A | 3/1999 | Sumner et al. | |
| 6,177,519 B1 | 1/2001 | Chung et al. | |
| 6,251,998 B1 | 6/2001 | Medsker et al. | |
| 6,841,642 B2 | 1/2005 | Kaszas | |
| 7,332,554 B2 * | 2/2008 | Shaffer et al. | 526/335 |
| 7,425,601 B2 * | 9/2008 | Chung et al. | 526/347 |
| 2006/0100398 A1 * | 5/2006 | Shaffer et al. | 526/64 |

FOREIGN PATENT DOCUMENTS

| | | |
|---|---|---|
| DE | 1 282 940 | 6/1956 |
| EP | 0 323 569 B1 | 12/1987 |
| GB | 842 557 | 7/1960 |
| WO | WO 92/02582 | 2/1992 |
| WO | WO 00/69966 | 11/2000 |
| WO | WO 01/21672 A1 * | 3/2001 |
| WO | WO 02/16452 | 2/2002 |
| WO | WO 03/050149 A | 6/2003 |
| WO | WO 2004/058828 | 7/2004 |
| WO | WO 2004/058835 A | 7/2004 |

OTHER PUBLICATIONS

"Chemical and Engineering New", 63(5), 27 (1985).
"Colloidal Systems and Interfaces", S. Ross and I.D. Morrison, J.W. Wiley, NY, 1988.
"The Vanderbilt Rubber Handbook", pp. 105-122, (Robert F. Ohn ed., R.T. Vanderbilt Co., Inc. ,1990.
Edward Kresge and H.C. Wang, "8 Kirk-Othmer Encyclopedia of Chemical Technology", pp. 934-955, John Wiley & Sons, Inc., 4th ed. 1993.
"Blue Book, Materials, Compounding Ingredients, Machinery and Services for Rubber", Don R. Smith, ed., Lippincott & Petto Inc., 2001.
"Rubber Technology", pp. 59-85, 1995.
"Rubber Technology", pp. 179-208 , Maurice Morton, Chapman & Hall, 1995.
"Rubber Technology", pp. 260-283, 1995.
"Rubber Technology", pp. 311-321, 1993.
"Encyclopedia of Chemical Technology", Kirk-Othmer,vol. 8, pp. 948-950, John Wiley & Sons, Inc., 4th Ed. 1993—cited in EPO proceeding Jan. 2010.
"Ullmann's Encyclopedia of Industrial Chemistry", Refractory of Ceramics to Silicon Carbide, Editors: B. Elvers, S. Hawkins, W. Russey, G. Schulz, 5$^{th}$ Completely Revised Edition, vol. A23, pp. 314-316—cited in EPO proceeding Jan. 2010.
"Synthesis, Bromination and Cure of Isobutylene/Isoprene/p-Methylstyrene and Isobutylene/Isoprene/Styrene Terpolymers", Gabor Kaszas and Binh Tran, Bayer Inc., Rubber Division, Rubber Chemistry and Technology, vol. 75, pp. 155-169—cited in EPO proceeding Jan. 2010.

* cited by examiner

*Primary Examiner*—Robert D. Harlan
(74) *Attorney, Agent, or Firm*—Nancy T. Krawczyk

(57) ABSTRACT

A branched isobutylene-styrenic elastomer with a broad molecular weight distribution is disclosed comprising an interpolymer of an isoolefin monomer as isobutylene, a styrenic monomer such as p-methylstyrene, and a multiolefin such as divinylbenzene. The elastomer has improved green strength, relaxation characteristics, and processability in melt processing, while retaining excellent aging characteristics and barrier properties, and can be used in a blend with a linear isobutylene-p-alkylstyrene elastomer to improve processability of the linear elastomer. Also disclosed are a method for processing the linear elastomer with an effective amount of the branched elastomer to improve processability, and nanocomposites, curable compositions, cured compositions and useful articles formed from the branched elastomer and the linear-branched elastomer blends.

71 Claims, 2 Drawing Sheets

PROCESSABLE BRANCHED ISOOLEFIN-ALKYLSTYRENE ELASTOMERS

FIELD OF THE INVENTION

This invention relates to branched isoolefin-alkylstyrene copolymers, and more particularly to such elastomers with improved green strength, relaxation time or other processability characteristics. The invention also relates to blends of the branched elastomers with linear elastomers, methods to produce and use the branched elastomer compositions, nanocomposites and other compositions of the branched elastomers useful for air barriers, and their use in articles of manufacture.

BACKGROUND OF THE INVENTION

Polymers with a saturated hydrocarbon backbone are well known to possess good environmental and aging resistance which makes them highly desirable in a variety of applications. Furthermore, rubbery copolymers containing major amounts of polyisobutylene are well known to possess low permeability, unique damping properties, and low surface energy, which makes them particularly highly desired in many applications. However, the "inertness" of these saturated hydrocarbon polymers, their low reactivity and incompatibility with most other materials, and the difficulties in adhering them to, or using them in conjunction with most other materials has restricted their use in many areas.

Polymer compositions having low gas permeability, unique damping properties, and low surface energy are useful in applications such as tire innerliners. U.S. Pat. No. 5,162,445 discloses a method to improve polymer blend compatibility or blend co-curability by copolymerizing an unsaturated comonomer and/or a comonomer having reactive functionality with isobutylene. One example of such a polymer is a partially brominated copolymer of isobutylene and p-methylstyrene (BIMS). U.S. Pat. No. 5,548,029 discloses graft copolymers of isobutylene-p-methylstyrene copolymers to compatibilize blends of saturated and unsaturated elastomers.

The isobutylene-p-methylstyrene copolymers, a variety of functionalized derivatives thereof, and BIMS in particular, are useful in clay nanocomposites. See, for example, commonly assigned U.S. application Ser. No. 11/183,361, Split-Stream Process for Making Nanocomposites, by W. Weng et al., filed Jul. 18, 2005; and commonly assigned U.S. application Ser. No. 11/184,000, Functionalized Isobutylene Polymer-Inorganic Clay Nanocomposites and Organic-Aqueous Emulsion Process, by W. Weng et al., filed Jul. 18, 2005, the entirety of which are incorporated by reference.

The isobutylene-p-methylstyrene copolymers disclosed in the above listed patents typically have narrow molecular weight distributions (Mw/Mn<2.5), limiting green strength, and slow relaxation times that are not conducive to processability of the uncured formulations.

On the other hand, unsaturated isobutylene rubbers such as isobutylene—isoprene copolymers are known for generally difficult filler dispersion, e.g. they form poor nanocomposites with clay relative to PIBS. Isobutylene—isoprene copolymers typically have much broader molecular weight distributions than do the isobutylene para-methylstyrene copolymers. U.S. Pat. No. 6,841,642 to Kaszas (WO02/16452) discloses a polymer formed by reaction of a mixture of isobutylene, isoprene, divinylbenzene and a chain transfer agent, the entirety of which is incorporated by reference. Incorporation of DVB to the isobutylene—isoprene copolymer with the chain transfer agent is said to increase the viscosity and elasticity of the polymer at very low shear rates and to reduce the viscosity and elasticity at high shear rates, providing a butyl polymer having an improved balance of (more resistance to) cold flow, (higher degree of) filler dispersion, (higher) extrusion rate and (reduced) die swell.

A process for preparing rubbery polymers and copolymers in fluorinated hydrocarbon solvents is disclosed in WO 2004/058828, published Jul. 15, 2004, the entirety of which is incorporated by reference. Compared to chlorinated hydrocarbon solvents used in the polymerization of isobutylene-isoprene copolymers, the fluorinated hydrocarbon solvents generally produce butyl polymers with a narrower molecular weight distribution or polydispersity (Mw/Mn).

There exists a need to improve the ability to process the saturated isobutylene based polymers and polymer blends, including improvements in green strength, polymer compatibility, co-curability, and relaxation balance/times, while maintaining aging resistance, filler dispersibility, air barrier, and other desirable characteristics.

SUMMARY OF THE INVENTION

The present invention provides a branched polyisobutylene with a generally saturated polymer backbone, which has improved green strength, relaxation characteristics, and other properties to facilitate melt processing, while retaining other desirable characteristics.

In one embodiment, the present invention is directed to an elastomer comprising: a branched interpolymer of mixed monomers comprising an isoolefin monomer, a styrenic monomer and a multiolefin monomer having at least two non-conjugated carbon-carbon double bonds. The isoolefin monomer can be a $C_4$ to $C_7$ isoolefin, such as, for example, isobutylene, isobutene 2-methyl-1-butene, 3-methyl-1-butene, 2-methyl-2-butene, 4-methyl-1-pentene, or a mixture thereof, especially isobutylene. The styrenic monomer can be p-alkylstyrene such as p-methylstyrene. A portion of the p-methylstyrene groups are optionally halogenated. The multiolefin monomer can be a $C_5$ to $C_{14}$ diene, e.g. an alkyl substituted α-ω diene in which the alkyl substituent can be a $C_1$ to $C_3$ alkyl or branched chain alkyl. The multiolefin monomer can be, for example, a vinyl-substituted aromatic such as divinylbenzene, divinyltoluene, divinylxylene, or a $C_1$ to $C_3$ alkyl or branched chain alkyl substituted derivative thereof, or the like. The mixed monomers in one embodiment can be essentially free of conjugated diene, β-pinene, or other monomers that would tend to introduce unsaturation into the polymer backbone.

In one embodiment, the elastomer comprises from 80 to 99.5 weight percent of the isoolefin, from 0.5 to 20 weight percent of the p-methylstyrene, from 0.1 to 10 mole percent p-halomethylstyrene, and from 0.1 to 5 weight percent of the multiolefin monomer, wherein the weight percentages are based on the total weight of interpolymerized isoolefin and p-methylstyrene without regard to halogenation thereof and the mole percentages are based on the total moles of monomers interpolymerized in the elastomer and the mole percentages are based on the mole of monomers.

The branched elastomer can have from 0.01 to 1.5 mole percent styrenic vinyl in one embodiment, and from 0.2 to 1.0 mole percent styrenic vinyl in another embodiment, wherein the mole percentages are based on the mole of monomers. The branched elastomer can include a silicon-containing moiety chemically bound to a portion of the multiolefin monomer units, e.g. hydrosilylation via the residual reactive styrenic vinyl moieties.

The branched elastomer in various embodiments can have an Mw from 100,000 to 800,000, from 200,000 to 600,000 and/or from 50,000 to 500,000; a polydispersity (Mw/Mn) greater than 2.5, greater than 3, or greater than 3.5; an Mz/Mn greater than 3, greater than 6, or greater than 10; a viscosity average chain branching index (g') less than 0.978, less than 0.97, less than 0.95, less than 0.9, less than 0.85, less than 0.8, less than 0.75, or less than 0.7. Mw, Mn and Mz can be determined by the well known gel permeation chromatographic (GPC) methods. Viscosity average chain branching index (g') can be determined by triple detection size exclusion chromatography (SEC), also referred to as 3D-GPC, as described in WO 2004/058835.

The branched elastomer can be prepared in one embodiment by contacting the isoolefin monomer, the styrenic monomer and the multiolefin monomer in a reactor with one or more typical cationic initiators and Lewis acid co-initiators in a diluent, wherein the diluent comprises one or more fluorinated hydrocarbons in an amount effective to increase polydispersity (Mw/Mn). The fluorinated hydrocarbons are preferably selected from fluorinated hydrocarbons having from 1 to 3 carbon atoms.

The branched elastomer can also include various additives and/or blend components: a filler; intercalated clay particles dispersed therein to form a nanocomposite; a blend component selected from the group consisting of rubber processing oils, plasticizers, and mixtures thereof; a curative; or the like.

In another embodiment, the present invention is directed to a vulcanized composition prepared by curing the branched elastomer.

In a further embodiment, an elastomeric composition includes a physical blend of: (a) a first elastomer comprising an essentially linear isoolefin-p-alkylstyrene copolymer having a polydispersity (Mw/Mn) less than 2.5; and (b) a second elastomer comprising a branched isoolefin-p-alkylstyrene-multiolefin copolymer having a polydispersity (Mw/Mn) greater than 2.5. The isoolefin in the first and second elastomers can be the same or different and can be selected from $C_4$ to $C_7$ isoolefins, such as, for example, isobutylene, 2-methyl-1-butene, 3-methyl-1-butene, 2-methyl-2-butene, 4-methyl-1-pentene, or a mixture thereof, especially isobutylene. The p-alkylstyrene in the first and second elastomers can be the same or different and is preferably p-methylstyrene. A portion of the p-methylstyrene groups may be halogenated in the first elastomer, in the second elastomer or in a combination thereof. The multiolefin in the second elastomer may include a $C_5$ to $C_{14}$ non-conjugated diene or another alkyl substituted α-ω diene. The multiolefin may be selected from divinylbenzene, divinyltoluene, divinylxylene, or a $C_1$ to $C_3$ alkyl or branched chain alkyl substituted derivative thereof, or the like, especially divinylbenzene in one embodiment.

In one embodiment, the first elastomer comprises from 80 to 99.5 weight percent isobutylene, from 0.5 to 20 weight percent of the p-methylstyrene, and from 0.1 to 10 mole percent brominated p-methylstyrene; and the second elastomer comprises from 80 to 99.5 weight percent isobutylene, from 0.5 to 20 weight percent of the p-methylstyrene, optionally from 0.1 to 10 mole percent brominated p-methylstyrene, and from 0.1 to 5 weight percent of the multiolefin, wherein the weight percentages are based on the total weight of isobutylene and p-methylstyrene in the respective first and second elastomers without regard to any bromination thereof and the mole percentages are based on the mole of monomers. The elastomers in one embodiment can be essentially free of conjugated diene, β-pinene, or other monomers that introduce unsaturation into the polymer backbone.

In various embodiments, the first elastomer has a Mooney viscosity less than 45, less than 40, less than 35, or less than 30; the second elastomer has an Mw of at least 300,000, at least 400,000, or at least 500,000; and the second elastomer has an Mz/Mn greater than 1.5, greater than 1.7, or greater than 2. As used herein, Mooney viscosity is determined in accordance with ASTM D-1646, typically ML 1+8 (125° C.) in reference to butyl polymers unless otherwise noted.

In various embodiments the elastomer composition includes from 1 to 50 phr of the second elastomer, from 5 to 40 phr of the second elastomer, or from 10 to 30 phr of the second elastomer.

The second elastomer can be prepared by a process comprising contacting the isoolefin, the p-alkylstyrene and the multiolefin in a reactor with one or more initiators in a diluent, wherein the diluent comprises one or more fluorinated hydrocarbons in an amount effective to increase the polydispersity (Mw/Mn). The fluorinated hydrocarbons are preferably selected from fluorinated hydrocarbons having from 1 to 3 carbon atoms.

In one embodiment, the elastomer composition also includes intercalated clay. The clay can be an organoclay or inorganic clay. The clay may be a silicate. The clay preferably comprises smectite clay, such as, for example, montmorillonite, nontronite, beidellite, bentonite, volkonskoite, laponite, hectorite, saponite, sauconite, magadite, kenyaite, stevensite, vermiculite, halloysite, hydrotalcite, or a combination thereof, or the like, especially montmorillonite, bentonite, vermiculite, or a combination thereof.

The elastomer composition may include filler selected from calcium carbonate, mica, silica, (large-particle) silicates, talc, titanium dioxide, carbon black, and mixtures thereof, or the like. The elastomer composition may also include dye, pigment, antioxidant, heat and light stabilizer, plasticizer, oil, or a mixture thereof, or the like.

In further embodiments, the second elastomer may comprise reactive styrenic vinyl. The elastomer composition may further comprise organic peroxide, zinc oxide, zinc stearate, stearic acid, an accelerator, a vulcanizing agent, or a mixture thereof.

In a further embodiment, an air barrier comprises the cured elastomer composition described above. The air barrier can be in the form of an inner tube or tire innerliner.

In another embodiment, a tire comprises an innerliner comprising the cured elastomer composition described above.

In another aspect, the invention provides a method to process a linear isoolefin-p-alkylstyrene elastomer. The method includes the steps of (a) blending the linear isobutylene-p-methylstyrene elastomer with an effective amount of the branched elastomer described above to increase green strength and decrease relaxation time, and (b) melt processing the blend of linear and branched elastomers from (a). Green strength can be observed by comparing the viscosity of the blend at the same temperature, e.g. ambient temperature, at 1 reciprocal second as described in more detail below. Relaxation time can be measured for comparison at the same test conditions, e.g. time to relaxation to 25% of the initial modulus at initial 100% shear strain at 100° C. using a Rubber Processing Analyzer (RPA) as described in more detail below. The blending in (a) can include emulsion blending, solution blending, melt blending, or the like.

The blending in (a) in another embodiment further comprises blending a vulcanizing agent with the linear and branched elastomers to form a curable elastomer composition. The method can further include a step for curing the elastomer composition.

The blending in (a) in another embodiment further comprises blending clay with the linear and branched elastomers to form a nanocomposite. In one embodiment, the blending in (a) includes blending a vulcanizing agent with the clay and the linear and branched elastomers to form a curable nanocomposite. Further, the method can include a step for curing the nanocomposite.

These and other facets of the present invention shall become apparent from the following detailed description, figure, and appended claims.

DETAILED DESCRIPTION

Figure 1:
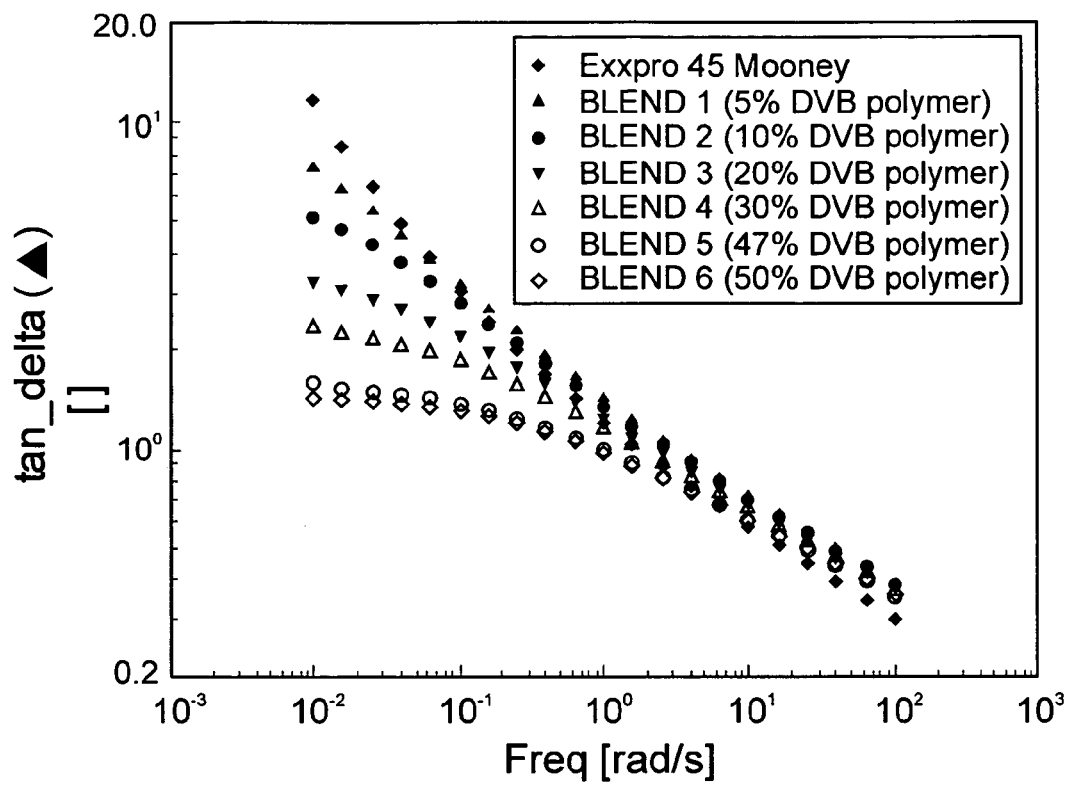
FIG. 1 is a graph of the rheology test results (tan δ vs. shear rate) for the blends of divinylbenzene (DVB)-modified polymers of Examples 20-25 according to embodiments of the present invention.

This invention describes a process for making isobutylene-DVB copolymers and isobutylene-DVB copolymer—clay nanocomposites, where the isobutylene-DVB copolymers have branched structures and/or broader molecular weight distributions. The polymers and nanocomposite formed by the process of this invention can have improved green strength, relaxation characteristics, and co-curability, as well as air barrier properties making the polymers suitable for use as an innerliner or inner tube.

Definitions

As used herein, the new numbering scheme for the Periodic Table Groups is used as set forth in CHEMICAL AND ENGINEERING NEWS, 63(5), 27 (1985).

As used herein, "polymer" may be used to refer to homopolymers, copolymers, interpolymers, terpolymers, etc. Likewise, a copolymer may refer to a polymer comprising at least two monomers, optionally with other monomers. "Polymer" is also used to refer to oligomers, low polymers, and high polymers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition, the entirety of which is incorporated by reference. Elastomer includes mixed blends of polymers such as melt mixing and/or reactor blends of polymers. The terms may be used interchangeably with the term "rubber."

As used herein, "phr" is 'parts per hundred rubber' and is a measure common in the art wherein components of a composition are measured relative to a major elastomer component, based upon 100 parts by weight of the elastomer(s) or rubber(s).

As used herein, "phm" is 'parts per hundred monomer' and is a measure wherein interpolymerized monomer components of an isoolefin-alkylstyrene copolymer are measured relative to the total isoolefin and alkylstyrene monomers, based upon 100 parts by weight of the isoolefin and alkylstyrene monomer(s). Where the copolymer is halogenated to introduce halogen substituents onto the interpolymerized alkylstyrene monomer units, the halogen is disregarded for the phm calculation, i.e. phm is determined prior to or as if prior to halogenation. Similarly, percentages by weight of monomers in an isoolefin-alkylstyrene copolymer are measured relative to the total isoolefin and alkylstyrene monomers, without regard to halogen content. On the other hand, monomer contents of a copolymer expressed in mole percent are based on the total moles of all monomers present in the copolymer; e.g. an isobutylene-p-methylstryrene-p-bromomethylstyrene-divinylbenzene copolymer comprising from 0.1 to 10 mole percent p-bromomethylstyrene comprises from 90 to 99.9 mole percent of isobutylene plus p-methylstyrene plus divinylbenzene plus any other copolymerized monomers; or comprising from 0.2 to 1.0 mole percent styrenic vinyl, comprises 99 to 99.8 mole percent of isobutylene plus p-methylstyrene plus p-bromomethylstyrene plus divinylbenzene in another form plus any other copolymerized monomers.

As used herein, "isobutylene based elastomer" or "isobutylene based polymer" refers to elastomers or polymers comprising at least 70 mole percent repeat units from isobutylene.

As used herein, "isoolefin" refers to any olefin monomer having at least one carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "nanocomposite" or "nanocomposite composition" refers to polymer systems containing inorganic particles with at least one dimension in the nanometer range within a polymer matrix.

As used herein, "intercalation" refers to the state of a composition in which a polymer is present between each layer of a platelet filler. As is recognized in the industry and by academia, some indicia of intercalation can be the shifting and/or weakening of detection of X-ray lines as compared to that of original platelet fillers, indicating a larger spacing between vermiculite layers than in the original mineral.

As used herein, "exfoliation" refers to the separation of individual layers of the original inorganic particle, so that polymer can surround or surrounds each particle. In an embodiment, sufficient polymer is present between each platelet such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

As used herein, "solvent" refers to any substance capable of dissolving another substance. When the term solvent is used it may refer to at least one solvent or two or more solvents unless specified. In certain embodiments, the solvent is polar; in other embodiments, the solvent is non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, "suspension" refers to a system consisting of a solid dispersed in a solid, liquid, or gas usually in particles of larger than colloidal size.

As used herein, "emulsion" refers to a system consisting of a liquid or liquid suspension dispersed with or without an emulsifier in an immiscible liquid usually in droplets of larger than colloidal size.

As used herein, "hydrocarbon" refers to molecules or segments of molecules containing primarily hydrogen and carbon atoms. In some embodiments, hydrocarbon also includes halogenated versions of hydrocarbons and versions containing herteroatoms as discussed in more detail below.

Isobutylene Polymers

In some embodiments, the composition of the present invention includes a copolymer comprising $C_4$ to $C_7$ isoolefin derived units, alkylstyrene derived units and/or multiolefin derived units. The butyl polymers can be prepared, for example, by conventional butyl polymerization process using a comonomer mixture including the isoolefin. The isoolefin can be a $C_4$ to $C_7$ compound such as isobutylene, 2-methyl-1-butene, 3-methyl-1-butene, 2-methyl-2-butene, 4-methyl-1-pentene, or mixtures thereof, or the like.

The styrenic monomer derived unit can be derived from any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene.

The multiolefin can be any monomer with two or more olefinic unsaturations that can introduce branching into the isoolefin-alkylstyrene copolymer and broaden the molecular weight distribution. The multiolefin can be an alkyl substituted α-ω diene, or preferably an aromatic diolefin. Alkyl substituted α-ω dienes include, for example, $C_5$ to $C_{14}$ alkyl substituted dienes such as 3,3-dimethyl-1,5-hexadiene, and the like. Aromatic diolefins include divinylbenzene, divinyltoluene, divinylxylene, $C_1$ to $C_3$ alkyl or branched chain alkyl substituted derivatives thereof, or the like. Divinylbenzene, including substituted divinylbenzene, is particularly preferred.

Where a copolymer with a saturated backbone is desired for chemical inertness, e.g. at least 99.99 mole percent saturated (or not more than 0.01 mole percent unsaturated) or at least 99.999 mole percent saturated (or not more than 0.001 mole percent unsaturated), the monomer mixture is preferably free of added conjugated aliphatic diene, β-pinene or other monomers that would tend to introduce unsaturation into the polymer backbone. If a copolymer with backbone unsaturation is desired, however, the monomer mixture can include one or more of the conjugated aliphatic dienes or β-pinene. As used herein, "non-conjugated carbon-carbon double bonds" refers to a structure in which both of the paired carbon atoms in a particular double bond in the multiolefin monomer are inserted directly into the polymer chain via a carbon-carbon linkage with other monomer units so that olefinic unsaturation is not introduced into the polymer backbone; the term does not exclude multiolefins such as divinyl benzene that would introduce aromatic unsaturation into the backbone or crosslinkage.

The isoolefin can be in a range from 70 to 99.5 weight percent by weight of the total comonomer mixture in one embodiment, and 80 to 99.5 weight percent in another embodiment. The alkyl substituted α-ω diene component in one embodiment is present in the comonomer mixture from 30 to 0.5 weight percent in one embodiment, and from 15 to 0.5 weight percent in another embodiment. In yet another embodiment, from 8 to 0.5 weight percent of the comonomer mixture is alkyl substituted α-ω diene. In certain embodiments, the alkyl is selected from any $C_1$ to $C_5$ alkyl or branched chain alkyl.

One embodiment of the butyl rubber polymer of the invention can be obtained by reacting 92 to 99.5 weight percent of isobutylene with 0.1 to 10 weight percent divinylbenzene, or reacting 95 to 99.5 weight percent isobutylene and 0.5 to 5.0 weight percent divinylbenzene in yet another embodiment.

In other embodiments, the composition of the present invention can include at least one terpolymer comprising $C_4$ to $C_7$ isoolefin derived units, $C_4$ to $C_{14}$ multiolefin derived units, and styrenic monomer derived units.

The terpolymers can be prepared by reacting a monomer mixture, the mixture having at least (1) a $C_4$ to $C_7$ isomonoolefin monomer component such as isobutylene with (2) a multiolefin monomer component, and (3) a styrenic monomer component. The isomonoolefin can be in a range from 70 to 99.5 weight percent by weight of the total comonomer mixture in one embodiment, and 85 to 99.5 weight percent in another embodiment. The multiolefin component in one embodiment is present in the monomer mixture from 30 to 0.5 weight percent in one embodiment, and from 15 to 0.5 weight percent in another embodiment. In yet another embodiment, from 8 to 0.5 weight percent of the monomer mixture is alkyl substituted α-ω diene. The styrenic monomer component in one embodiment is present in the monomer mixture from 30 to 0.5 weight percent in one embodiment, and from 15 to 0.5 weight percent in another embodiment. In yet another embodiment, from 8 to 0.5 weight percent of the monomer mixture is styrenic monomer.

Crosslinking and Functionalization

The incorporation of divinylbenzene in the polymer not only creates branching, but it can also result in a polymer having unreacted styrenic vinyl groups. These styrenic groups can be very reactive in radical initiated crosslinking during cure or vulcanization. Due to the ability to crosslink the styrenic vinyl groups, halogenation of the relatively inert butyl backbone is unnecessary to promote curing of the polymer.

In addition, the reactive styrenic vinyl groups can be useful in derivation and finctionalization of the polymer. Silylation, as described in relation to isobutylene/para-methylstyrene copolymers in U.S. Pat. No. 6,177,519, is one example of the finctionalization of the terpolymer as described above, the entirety of which is incorporated by reference. Hydrosilylation of a polymer and its effect on curing the polymer is discussed in U.S. Pat. No. 6,251,998, to Medsker et al., as another example, the entirety of which is incorporated by reference.

Secondary Rubber Component

A secondary rubber or "general purpose rubber" component may be present in compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprenebutadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646, the entirety of which is incorporated by reference.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product used in the composition is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R. T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445; 4,074,035; and U.S. Pat. No. 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963, the entirety of which are incorporated by reference.

In one embodiment of the invention, a so called semi-crystalline copolymer ("SCC") is present as the secondary "rubber" component. Semi-crystalline copolymers are described in WO00/69966, the entirety of which is incorporated by reference. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

The combined polymer component of the compositions or nanocomposites of the present invention may comprise at least one polymer or elastomer as described in any of the above polymer or elastomers or may comprise any combination of at least two or more of the polymers and elastomers described above. In an embodiment, the elastomer or polymer comprises at least one isobutylene-based polymer. In another embodiment, the elastomer or polymer comprises at least one isobutylene-based polymer and at least one other rubber. In yet another embodiment, the elastomer or polymer comprises at least two or more isobutylene-based polymers.

Fillers, Curatives and Other Additives

The composition of the invention may also include one or more filler components such as calcium carbonate, clay, mica, silica and silicates, talc, titanium dioxide, and carbon black. As used herein, fillers do not include inorganic clay and/or organoclay particles forming part of the nanocomposite matrix, e.g. clay particles having a dimension in the nanometer range, but larger clay particles can be used as a filler in the nanocomposites, if desired. In one embodiment, the filler is carbon black or modified carbon black. The preferred filler is semi-reinforcing grade carbon black present at a level of from 10 to 150 phr of the blend, more preferably from 30 to 120 phr. Useful grades of carbon black as described in RUBBER TECH- NOLOGY 59-85 (1995) range from N110 to N990. More desirably, embodiments of the carbon black useful in, for example, tire treads are N229, N351, N339, N220, N234 and N110 provided in ASTM (D3037, D1510, and D3765), the entirety of which are incorporated by reference. Embodiments of the carbon black useful in, for example, sidewalls in tires, are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2, 4, 6-trimercapto-5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the fillers, additives, and/or curative components may be carried out by combining the desired components and the nanocomposite of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the polymer to form the nanocomposite.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

Clays

The nanocomposites that can be made with the polymers of the present invention can contain swellable inorganic clay. Swellable layered inorganic clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered clay can be exfoliated by suspending the clay in a water solution. Preferably, the concentration of clay in water is sufficiently low to minimize the interaction between clay particles and to fully exfoliate the clay. In one embodiment, the aqueous slurry of clay can have a clay concentration of between 0.1 and 5.0 weight percent; between 0.1 and 3.0 weight percent in other embodiments.

In certain embodiments, an aqueous slurry of clay can be prepared by stirring clay and water at room temperature for a time sufficient to exfoliate the clay. In one embodiment, the clay and water can be stirred for between 0.25 and 24 hours. The clay and water can be stirred for between 4 and 16 hours, or between 10 and 14 hours, in other embodiments.

In other embodiments, the clay can be mixed with an organic liquid to form a clay dispersion. The clay can be an inorganic clay or an organically modified clay; the organic liquid can be miscible or immiscible in water. In certain embodiments, the dispersion can have a clay concentration of between 0.1 and 5.0 weight percent; between 0.1 and 3.0 weight percent in other embodiments.

The layered clay can also be intercalated and exfoliated by treatment with organic molecules (swelling or exfoliating "agents" or "additives") capable of undergoing ion exchange reactions with the cations present at the interlayer surfaces of the layered silicate. Suitable exfoliating additives include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^{12}R^{13}R^{14}N$, wherein $R^{12}$, $R^{13}$, and $R^{14}$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^{12}$ is a $C_{14}$ to $C_{20}$ alkyl or alkene.

The exfoliating agent can also be a diamine compound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R^{18}R^{19}N-R^{20}-NR^{21}R^{22}$, wherein $R^{18}$, $R^{19}$, $R^{20}$, $R^{21}$, and $R^{22}$ are the same or different $C_1$ to $C_{30}$ alkyls or alkenes, or $C_1$ to $C_{20}$ alkyls or alkenes. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, N,N,N'-trimethyl-N'-tallow-1,3-diaminopropane, and so on.

Another class of exfoliating additives include those which can be covalently bonded to the interlayer surfaces. These include polysilanes of the structure $-Si(R^{15})_2R^{16}$ where $R^{15}$ is the same or different at each occurrence and is selected from alkyl, alkoxy or oxysilane and $R^{16}$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582, the entirety of which are incorporated by reference.

In a preferred embodiment of the invention, the exfoliating additive or additives are capable of reaction with the halogen sites on the interpolymer to form complexes which help exfoliate the clay. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 20 phr in one embodiment, and from 0.2 to 15 phr in yet another embodiment, and from 0.3 to 10 phr in yet another embodiment. The exfoliating additive may be added to the composition at any stage; for example, the additive may be added to the interpolymer, followed by addition of the clay, or may be added to the interpolymer and clay mixture; or the additive may be first blended with the clay, followed by blending with the interpolymer in yet another embodiment.

In another embodiment of the invention, improved interpolymer impermeability is achieved by the presence of at least one polyfunctional curative. An embodiment of such polyfunctional curatives can be described by the formula Z—$R^{17}$—Z', wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfinctional compounds included in the above formula. Non-limiting examples of such polyfinctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don. R. Smith, ed., Lippincott & Petto Inc. 2001). The polyfunctional curative, if present, may be present in the composition from 0.1 to 8 phr in one embodiment, and from 0.2 to 5 phr in yet another embodiment.

Treatment with the swelling agents described above results in intercalation or "exfoliation" of the layered platelets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The amount of clay or exfoliated clay incorporated in the nanocomposites in accordance with this invention is sufficient to develop an improvement in the mechanical properties or barrier properties of the nanocomposite, for example, tensile strength or oxygen permeability. Amounts of clay in the nanocomposite generally will range from 0.5 to 10 weight percent in one embodiment, and from 1 to 5 weight percent in another embodiment, based on the polymer content of the nanocomposite. Expressed in parts per hundred rubber, the clay or exfoliated clay may be present from 1 to 30 phr in one embodiment, and from 5 to 20 phr in another embodiment.

Nanocomposite Processing

Nanocomposites can be formed using a variety of processes. For example, in commonly assigned U.S. Application Ser. No. U.S. application Ser. No. 11/184,000, by W. Weng et al., filed Jul. 18, 2005, the entirety of which is incorporated by reference, there is disclosed a method for preparing clay-butyl rubber nanocomposites from an emulsion of rubber solution and aqueous clay dispersion in which the clay can be an inorganic clay. As another example of nanocomposite processing, in commonly assigned US Application Ser. No. application Ser. No. 11/183,361, by W. Weng et al., also filed Jul. 18, 2005, the entirety of which is incorporated by reference, there is disclosed a method for preparing clay-butyl rubber nanocomposites by preparing a concentrated nanocomposite from a slipstream of the rubber and blending the concentrate with a main rubber stream.

Melt Blending

The nanocomposite of the present invention can be formed by a polymer melt blending process. Blending of the components can be carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the nanocomposite.

Emulsion Processes

The nanocomposite of the present invention can also be formed by an emulsion processes. In one embodiment, the emulsion process can comprise mixing an aqueous slurry of inorganic clay with a polymer solution (cement). The mixing should be sufficiently vigorous to form emulsions or micro-emulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a nanocomposite is produced by a process comprising contacting Solution A comprising water and at least one layered clay with Solution B comprising a solvent and at least one elastomer; and removing the solvent and water from the contact product of Solution A and Solution B to recover a nanocomposite. In certain embodiments, the emulsion is formed by subjecting the mixture to agitation using a high-shear mixer.

In some embodiments, a nanocomposite is produced by a process comprising contacting Solution A comprising water and at least one layered clay with Solution B comprising a solvent and at least one elastomer, wherein the contacting is performed in the presence of an emulsifier or surfactant.

The emulsions of the present invention are formed by conventional emulsion technology, that is, subjecting a mixture of the hydrocarbon, water and surfactant, when used, to sufficient shearing, as in a commercial blender or its equivalent for a period of time sufficient for forming the emulsion, e.g., generally at least a few seconds. For general emulsion information, see generally, "Colloidal Systems and Interfaces", S. Ross and I. D. Morrison, J. W. Wiley, NY, 1988. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 weight percent of the total emulsion, more preferably about 0.001 to about 3 weight percent, and most preferably 0.01 to less than 2 weight percent.

Cationic surfactants useful in preparing the emulsions of this invention include tertiary amines, diamines, polyamines, amine salts, as well as quaternary ammonium compounds. Non-ionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

Solution Blending

The nanocomposite of the present invention can also be formed by solution blending. In certain embodiments, a nanocomposite is produced by a process comprising contacting Solution A comprising a solvent comprising a hydrocarbon and at least one layered filler or clay with Solution B comprising a solvent and at least one elastomer, and removing the solvents from the contact product of Solution A and Solution B to form a nanocomposite.

In the previous embodiments, the layered filler may be layered clay treated with organic molecules as described above. In yet another embodiment, a nanocomposite is produced by a process comprising contacting at least one elastomer and at least one layered filler in a solvent; and removing the solvent from the contact product to form a nanocomposite.

In another embodiment, a nanocomposite is produced by a process comprising contacting at least one elastomer and at least one layered filler in a solvent mixture comprising two solvents; and removing the solvent mixture from the contact product to form a nanocomposite.

In still another embodiment, a nanocomposite is produced by a process comprising contacting at least one elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one elastomer and dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In the embodiments described above, solvents may be present in the production of the nanocomposite composition from 30 to 99 wt %, alternatively from 40 to 99 wt %, alternatively from 50 to 99 wt %, alternatively from 60 to 99 wt %, alternatively from 70 to 99 wt %, alternatively from 80 to 99 wt %, alternatively from 90 to 99 wt %, alternatively from 95 to 99 wt %, based upon the total wt of the composition.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

In still other embodiments, a nanocomposite formed from an above described process to improve the air impermeability of an elastomer has an oxygen transmission rate of 150 mm.cc/[$m^2$.day] at 40° C. or lower as measured on cured nanocomposite compositions or articles as described herein.

Alternatively, the oxygen transmission rate is 150 mm.cc/[$m^2$.day] at 40° C. or lower as measured on cured nanocomposite compounds as described herein; the oxygen transmission rate is 140 mm.cc/[$m^2$.day] at 40° C. or lower as measured on cured nanocomposite compounds as described herein; the oxygen transmission rate is 130 mm.cc/[$m^2$.day] at 40° C. or lower as measured on cured nanocomposite compounds as described herein; the oxygen transmission rate is 120 mm.cc/[$m^2$.day] at 40° C. or lower as measured on cured nanocomposite compounds as described herein; the oxygen transmission rate is 110 mm.cc/[$m^2$.day] at 40° C. or lower as measured on cured nanocomposite compounds as described herein; the oxygen transmission rate is 100 mm.cc/[$m^2$.day] at 40° C. or lower as measured on cured nanocomposite compounds as described herein; the oxygen transmission rate is 90 mm.cc/[$m^2$.day] at 40° C. or lower as measured on cured nanocomposite compounds as described herein; the oxygen transmission rate is 80 mm.cc/[$m^2$.day] at 40° C. or lower as measured on cured nanocomposite compounds as described herein; or, the oxygen transmission rate is 80 mm.cc/[$m^2$.day] at 40° C. or lower as measured on cured nanocomposite compounds as described herein.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

Vulcanization/Curing

The term "dynamic vulcanization" is used herein to connote a vulcanization process in which a vulcanizable composition of the present invention is vulcanized under conditions of high shear. In one embodiment, the vulcanizable composition can be the terpolymer comprising an isoolefin monomer derived unit, a styrenic monomer derived unit, and a multiolefin derived unit. In other embodiments, the vulcanizable composition can include the terpolymer and a copolymer of isobutylene and para-methylstyrene. In yet other embodiments, the vulcanizable composition can include clay, a secondary rubber, additives, fillers, or mixtures thereof. As a result, the vulcanizable composition is simultaneously crosslinked and dispersed as fine particles of a "micro gel" within the resulting polymer matrix.

In one embodiment, dynamic vulcanization is effected by mixing the ingredients at a temperature which is at or above the curing temperature of the unsaturated polymer components in equipment such as roll mills, Banbury® mixers, continuous mixers, kneaders or mixing extruders, e.g., twin screw extruders. The unique characteristic of the dynamically cured compositions is that, notwithstanding the fact that the polymer component may be fully cured, the compositions can be processed and reprocessed by conventional rubber processing techniques such as extrusion, injection molding, compression molding, etc. Scrap or flashing can be salvaged and reprocessed.

In the embodiment of the invention in which it is desired to obtain dynamically vulcanized alloys (DVA's) the alloys are generally prepared by blending together at least one saturated polymer and at least one unsaturated polymer with curatives and fillers under conditions of dynamic vulcanization.

In some embodiments when it is desired to produce a vulcanized composition, any conventional curative system which is capable of vulcanizing saturated polymers may be used to vulcanize at least the elastomeric terpolymer of a $C_4$ to $C_7$ isomonoolefin, a multiolefin, and a para-alkylstyrene. Suitable curative systems for the elastomeric terpolymer component of the present invention include zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5-triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD (diphenyl phenylene diamine), salicyclic acid (o-hydroxy benzoic acid), wood rosin (abietic acid), and TMTDS (tetramethyl thiuram disulfide) in combination with sulfur. The vulcanization can be conducted at conditions to vulcanize at least partially, preferably fully, the halogenated elastomeric copolymer.

In other embodiments when it is desired to produce a vulcanized composition, any conventional curative system which is capable of vulcanizing unsaturated polymers may be used to vulcanize at least the elastomeric terpolymer of a $C_4$ to $C_7$ isomonoolefin, a multiolefin, and a para-alkylstyrene, wherein the terpolymer comprises unreacted styrenic vinyl. Free radical initiators such as peroxides, including peresters, perketals, and peroxycarbonates for example, and substituted azonitrile compounds can be used as accelerators or vulcanizing agents. Substituted azonitrile compounds can include 1,1-azobis(1-cyclohexanecarbonitrile), 2,2-azobis(isobutyronitrile (AIBN), 2,2-azobis(2-methylbutyronitrile, or other azonitrile compounds such as those commercially available from DuPont™ under the trade name VAZO®, or those available from Akzo Nobel™ under the trade name PERKADOX®, for example.

In the practice of this invention the elastomeric terpolymer and optional other polymers can be mixed together at a temperature sufficient to soften the resin or, more commonly, at a temperature above its melting point when the resin is crystalline at room temperature. If the mixture is to be dynamically vulcanized, after the resin and other polymers have been intimately mixed, the curative or curatives are added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the matrix resin to about 300° C.; more typically, the temperature may range from about the melting point of the matrix resin to about 275° C. Preferably the vulcanization is carried out at a temperature range from about the flux temperature of the polymer blend to about 20° C. above the softening or melting temperature of the matrix resin.

It is preferred that the mixing process be continued until the desired level of vulcanization is completed. If vulcanization is permitted to continue after mixing has stopped, the composition may not be reprocessable as a thermoplastic. However, the dynamic vulcanization can be carried out in stages. For example, vulcanization can be commenced in a twin screw extruder and pellets formed of the DVA material using an underwater pelletizer thereby quenching the vulcanization before it is completed. It can be completed at a later time under dynamic vulcanization conditions. Those skilled in the art will appreciate the appropriate quantities, types of curatives and extent of mixing time required to carry out the vulcanization of the rubber. Where necessary the rubber alone can be vulcanized using varying amounts of curative to determine the optimum cure system to be utilized and the appropriate cure conditions to achieve a full cure.

While it is preferred that all components be present in the mix prior to carrying out the dynamic vulcanization process of this invention, this is not a necessary condition. For example, in one embodiment, the elastomer to be cured can be dynamically vulcanized in the presence of a portion or all of the saturated isobutylene polymer. This blend can then be let down into additional saturated isobutylene polymer. Similarly, it is not necessary to add all of the fillers and oil prior to dynamic vulcanization. A portion or all of the additives, fillers and oil can be added during or after the vulcanization is completed. Certain ingredients, such as stabilizers and process aids function more effectively if they are added after curing.

The term "fully vulcanized" as used herein with respect to the dynamically vulcanized rubber components of this invention means that the rubber components to be vulcanized have been cured to a state in which the physical properties of the rubber are developed to impart elastomeric properties to the rubber generally associated with the rubbers in their conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the elastomeric compositions are produced by vulcanizing the curable rubber components of the blends to the extent that they contain no more than about four percent by weight of the cured rubber components extractable at room temperature by a solvent which dissolves the rubbers which are intended to be vulcanized, and preferably to the extent that the composition contains less than two percent by weight extractable. In general, the lower the extractables of the cured rubber components, the better the properties; and still more preferably are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that of any rubber component, if optionally present, of the DVA which is not intended to be cured. Any insoluble pigments, fillers, etc., are subtracted from both the initial and final weights.

To employ cross-link density as the measure of the state of cure which characterizes the compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization. However, it should not be assumed, from the fact that the amount of curative is based on the rubber content of the blend and is that amount which gives the rubber alone the aforesaid cross-link density, that the curative does not react with the saturated isobutylene polymer or that there is no reaction between the saturated isobutylene polymer and the terpolymer. There may be highly significant reactions involved but of limited extent. However, the assumption that the crosslink density determined as described provides a useful approximation of the cross-link density of the compositions is consistent with the thermoplastic properties and with the fact that a large proportion of the resin can be removed from the composition by high temperature solvent extraction, with an appropriate solvent for the resin being used.

The cross-link density of the rubber is determined by equilibrium solvent swelling using the Flory-Rehner equation, as shown in J. Rubber Chem. and Tech. 30, p. 929. The appropriate Huggins solubility parameters for rubber solvent pairs used in the calculation were obtained from the review article by Sheehan and Bisio, J. Rubber Chem. & Tech. 39, 149. If the extracted gel content of the vulcanized rubber is low, it is necessary to use the correction of Bueche wherein the term v is multiplied by the gel fraction (% gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

Embodiments of the final nanocomposite of the present invention are useful as air barriers, such as used in producing innerliners for motor vehicles. In particular, the nanocomposites are useful in innerliners and innertubes for articles such as truck tires, bus tires, passenger automobile, motorcycle tires, and the like.

EXAMPLES

Examples 1-8

The reactions to form the polymers of Comparative Examples 1-2 and Examples 1-8 were performed in an inert atmosphere dry-box with less than 5 ppm water content. The polymerizations were carried out in a 500 mL glass reactor equipped with a high speed impeller. The reactor was washed with ethyl aluminum dichloride (EADC) solution (15 μL in 150 mL of methyl chloride (MeCl); 40 mM) to remove any poisons. The reactor was then charged with isobutylene (22.6 g), para-methylstyrene (3.56 g), 2,4,4-trimethylpentene (chain transfer agent "CTA") as required, DVB as required, and MeCl (236 g). The reaction mixture was cooled to $-94°$ C., and the polymerization was initiated by addition of EADC solution (14 mL of the 40 mM MeCl solution). After 10 minutes the reaction was terminated by addition of 25 mL of isopropanol. The polymer was dissolved in heptane and precipitated in acetone. The recovered reaction product was stabilized with BHT and dried in a vacuum oven for 48 hours at 45° C. Reaction parameters and results are presented in Table 1 (phm=parts per hundred parts PMS-isobutylene monomer mixture).

TABLE 1

Conditions and results for Examples 1-8 and Comparatives 1-2

| | Example | | | | | | | | | |
|---|---|---|---|---|---|---|---|---|---|---|
| | Comp. 1 | 1 | 2 | 3 | 4 | Comp. 2 | 5 | 6 | 7 | 8 |
| PMS-isobutylene Monomer Mixture Concentration (wt % in reactor) | 10 | 10 | 10 | 10 | 10 | 10 | 10 | 10 | 10 | 10 |
| Isobutylene (wt %) | 86.4 | 86.4 | 86.4 | 86.4 | 86.4 | 86.4 | 86.4 | 86.4 | 86.4 | 86.4 |
| PMS (wt %) | 13.6 | 13.6 | 13.6 | 13.6 | 13.6 | 13.6 | 13.6 | 13.6 | 13.6 | 13.6 |
| CTA (g) | 0.26 | 0.26 | 0.26 | 0.26 | 0.26 | 0.13 | 0.13 | 0.13 | 0.13 | 0.13 |
| CTA (phm) | 1 | 1 | 1 | 1 | 1 | 0.5 | 0.5 | 0.5 | 0.5 | 0.5 |
| DVB (mL) | 0 | 0.28 | 0.56 | 0.85 | 1.12 | 0 | 0.14 | 0.28 | 0.56 | 0.84 |
| DVB (phm) | 0 | 1 | 2 | 3 | 4 | 0 | 0.5 | 1 | 2 | 3 |
| Yield (g) | 4.8 | 5.44 | 4.9 | 5.44 | 3.36 | 10.8 | 13.86 | 10.34 | 8.72 | 8.37 |
| Monomer Conversion (%) | 18.3 | 20.8 | 18.7 | 20.8 | 12.8 | 41.2 | 52.9 | 39.5 | 33.3 | 31.9 |
| GPC Analysis | | | | | | | | | | |
| $M_n/1000$ | 140 | 137 | 132 | 136 | 119 | 188 | 184 | 209 | 218 | Gel |
| $M_w/1000$ | 231 | 264 | 284 | 414 | 319 | 355 | 433 | 531 | 651 | |
| $M_z/1000$ | 327 | 439 | 517 | 1043 | 856 | 525 | 792 | 1103 | 1470 | |
| MWD ($M_w/M_n$) | 1.66 | 1.92 | 2.15 | 3.04 | 2.67 | 1.89 | 2.36 | 2.55 | 2.99 | |
| $M_z/M_n$ | 2.34 | 3.2 | 3.92 | 7.67 | 7.16 | 2.79 | 4.31 | 5.29 | 6.76 | |

The results presented in Table 1 illustrate the broadening in the molecular weight distribution attainable by incorporation of small amounts of DVB into the backbone of the polymer chain. The increase in MWD with the amount of DVB present during the reaction is roughly linear for each respective concentration of chain transfer agent. The broadening achieved by incorporation of DVB into the polymer chain (as in Examples 1-8) can improve green strength and relaxation balance of elastomers as compared to the linear and narrow MWD counterparts (as in Comparatives 1-2), as will become more apparent through the following examples.

Examples 9-14

Physical properties of blends of the DVB-modified, branched isobutylene polymer and isobutylene-PMS copolymers are compared to isobutylene-PMS copolymers without DVB-modified polymer in Examples 9-14 and Comparatives 3-4.

The reactions to form the polymers of Examples 9-14 were performed in an inert atmosphere dry-box with less than 5 ppm water content. The polymerizations were carried out in a 500 mL glass reactor equipped with a high speed impeller. The reactor was washed with ethyl aluminum dichloride (EADC) solution (15 µL in 150 mL of methyl chloride (MeCl); 40 mM) to remove any poisons. The reactor was then charged with isobutylene (22.6 g), para-methylstyrene (3.56 g), 2,4,4-trimethylpentene (0.13 g), DVB (285 µL), and MeCl (236 g). The reaction mixture was cooled to −94° C., and the polymerization was initiated by slow addition of EADC solution (44.5 mM) and t-BuCl (16.0 mM). After 10 minutes the reaction was terminated by addition of 25 mL of isopropanol. The polymer was dissolved in heptane and precipitated in acetone. The recovered reaction product was stabilized with BHT and dried in a vacuum oven for 18 hours at 60° C.

The molecular weight of the DVB-modified, branched isobutylene polymer was determined by GPC: $M_n$=297,100; $M_w$=770,100; $M_z$=1,616,000; MWD=2.59; $M_z/M_w$=2.1. The branching index was measured by GPC-light scattering-viscometry: g'=0.86.

The DVB-modified polymer was blended with a commercial unbrominated Exxpro™ polymer (XP=50: 6.1 wt. % PMS; Mooney Viscosity=36). The blending was conducted in a cyclohexane solution by dissolving 12 grams of the polymers (with compositions as given in Table 2) in cyclohexane and stirring at ambient temperature for 2 hours. The polymer blends were precipitated by addition of acetone and dried in a vacuum oven for 18 hours at 60° C.

TABLE 2

Blend Compositions

| Example | Exxpro™ (g) | DVB-modified Polymer (g) | DVB-modified polymer (wt. %) |
|---|---|---|---|
| 9 (blend 1) | 11.4 | 0.6 | 5.0 |
| 10 (blend 2) | 10.8 | 1.2 | 10 |
| 11 (blend 3) | 9.6 | 2.4 | 20 |
| 12 (blend 4) | 8.4 | 3.6 | 30 |
| 13 (blend 5) | 6. | 5.35 | 47.1 |
| 14 (blend 6) | 7.2 | 7.2 | 50 |

The melt rheology properties were obtained with an Advanced Rheometrics Expansion system (ARES) rheometer using 25-mm parallel plate geometry. Sample specimens were stabilized and compression molded at 190° C. under vacuum. Care was exercised to assure linear viscoelastic response, and measurement was carried out at 170° C. with 5% strain. Isothermal frequency sweeps were performed over $10^{-2}<\omega<10^2$ radians/s. FIG. 1 presents the rheology test results (tan δ vs. shear rate). The tan δ value is the ratio of loss modulus (G″) to storage modulus (G′), and a decrease of tan δ at low frequency indicates an improvement in green strength.

The results presented in FIG. 1 indicate that the green strength of the blends increased with an increase in the concentration of the DVB-modified polymer. Green strength improved with an increase in the number of entanglements due to the crosslinking and higher molecular weight of the DVB-modified polymer.

The stress relaxation behaviors of the blends were further analyzed on a Rubber Processing Analyzer (RPA). The modulus and relaxation of the polymers was recorded immediately after initial 100% shear strain at 100 C. The data are summarized in Table 3. The $G_{max}$ represents initial modulus. It is also the maximum modulus on RPA stress relaxation curve. The $t_{75}$ is the time at which the modulus drops to 25% of the initial $G_{max}$. The data show that blending DVB-modified polymer into a low Mooney XP-50 has minimal impact on modulus. The relaxation time ($t_{75}$) increases with increasing amount of DVB-modified polymer. However, all blends have faster relaxation as compared to EXXPRO™ 01-5 (a commercial isobutylene—PMS copolymer with a Mooney viscosity of 45).

TABLE 3

RPA Data of DVB-Modified Polymer Blends

| Example | Polymer | $G_{max}$ (Kpa) | $T_{75}$ (s) |
|---|---|---|---|
| Comp. 3 | XP-50, 36 Mooney | 184.91 | 1.21 |
| 10 | Blend 2 | 190.84 | 1.33 |
| 11 | Blend 3 | 189.66 | 1.35 |
| 12 | Blend 4 | 190.84 | 1.4 |
| 13 | Blend 5 | 189.24 | 1.53 |
| 14 | Blend 6 | 189.34 | 1.64 |
| Comp. 4 | Exxpro ™ 01-5, 45 Mooney | 210.79 | 2.13 |

Figure 2:
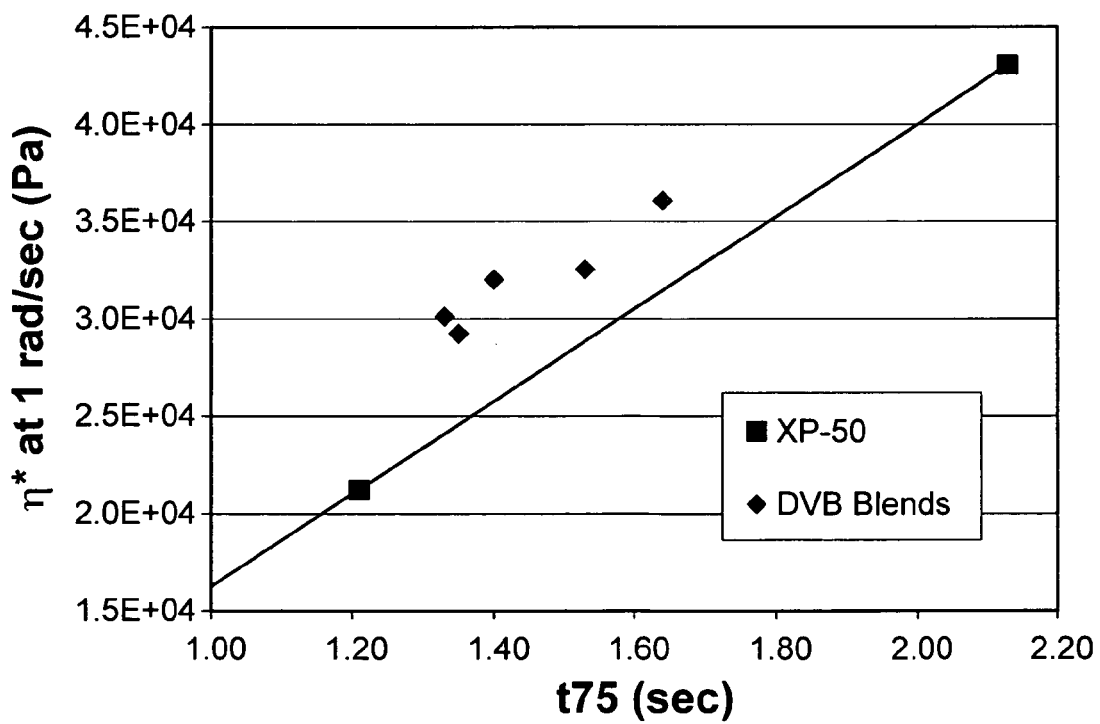
FIG. 2 is a graph of the shear viscosity at 1 rad/sec plotted versus $t_{75}$ in for the DVB-modified polymer blends of Examples 20-25 and the linear XP-50 and Exxpro™ 01-5 polymers (both labeled as XP-50).

Combining the rheology and RPA results, the shear viscosity at 1 rad/sec is plotted versus $t_{75}$ FIG. 2 for the DVB-modified polymer blends and the linear XP-50 and Exxpro™ 01-5 polymers (both labeled as XP-50 in FIG. 2). The linear polymer with higher viscosity shows a slower relaxation. However, all blends are above the correlation line of linear polymer, showing higher viscosity, implying a higher green strength, and faster relaxation as compared to linear polymers. The results suggest that green strength and relaxation can be both improved if the DVB-modified polymer is blended into a lower Mooney linear polymer, and a balanced property enhancement can be achieved.

Examples 15-18

Isobutylene (IB) and p-methylstyrene (PMS) were polymerized in methyl chloride (MeCl) without divinylbenzene (Comparative 5) and with increasing amounts of divinylbenzene from 1 to 4 percent by weight of the IB and PMS monomers. All experiments were performed in an inert atmosphere dry-box with 5 ppm of $H_2O$ content. The polymerization was carried out in a 500-mL glass reactor equipped with a high speed impeller. The reactor was washed with ethyl aluminum dichloride (EADC) solution (15 pL in 150 mL of MeCl), and then charged with isobutylene (22.6 g, 86.4 wt%), p-methylstyrene (3.56 g, 13.6 wt %), 2,4,4-trimethylpentene (0.26 g, 1.0 wt %), MeCl (236 g), and divinylbenzene (0 mL, 0 wt %; 0.28 mL, 1 wt %; 0.56 mL, 2 wt %; 0.84 mL, 3 wt %; or 1.12 mL, 4 wt %). The reaction mixture was cooled to −94° C. The polymerization was initiated by addition of EADC solution (14 mL of 40 mM solution in MeCl). After 10 minutes the reaction was terminated by adding 25 mL of isopropanol. The polymer was dissolved in heptane, and precipitated in acetone. The product was stabilized with BHT and dried in a vacuum oven for 48 hours at 45° C. Polymer yields, conversions and molecular weight and branching characterizations are presented in Table 6 below.

TABLE 4

Conditions and Results for Examples 15-18

| | Example | | | | |
|---|---|---|---|---|---|
| | Comp. 5 | 15 | 16 | 17 | 18 |
| Solvent | MeCl | MeCl | MeCl | MeCl | MeCl |
| Monomer Proportions | | | | | |
| Isobutylene (wt %) | 86.4 | 86.4 | 86.4 | 86.4 | 86.4 |
| PMS (wt %) | 13.6 | 13.6 | 13.6 | 13.6 | 13.6 |
| Divinylbenzene (phm) | 0 | 1 | 2 | 3 | 4 |
| Diisobutylene (phm) | 1 | 1 | 1 | 1 | 1 |
| Yield (g) | 4.8 | 5.44 | 4.9 | 5.44 | 3.36 |
| Monomer Conversion (%) | 18.3 | 20.8 | 18.7 | 20.8 | 12.8 |
| GPC Analysis | | | | | |
| $M_n/1000$ | 139.5 | 137.1 | 131.9 | 136 | 119.4 |
| $M_w/1000$ | 231.4 | 263.8 | 283.5 | 413.9 | 319.2 |
| $M_z/1000$ | 326.9 | 439.1 | 516.7 | 1043 | 866.6 |
| MWD ($M_w/M_n$) | 1.66 | 1.92 | 2.15 | 3.04 | 2.67 |
| $M_z/M_n$ | 2.34 | 3.20 | 3.92 | 7.67 | 7.18 |
| GPC-3D (g' viscosity average) | 1.02 | 0.95 | 0.93 | 0.78 | 0.77 |

Examples 19-22

The procedure of Examples 15-18 and Comparative 5 was repeated with using 1,1,2,2-tetrafluoroethane (obtained under trade designation R134a) as the solvent instead of MeCl. The reactant concentrations, polymer yields, conversions and molecular weight and branching characterizations are presented in Table 5 below.

Figure 3:
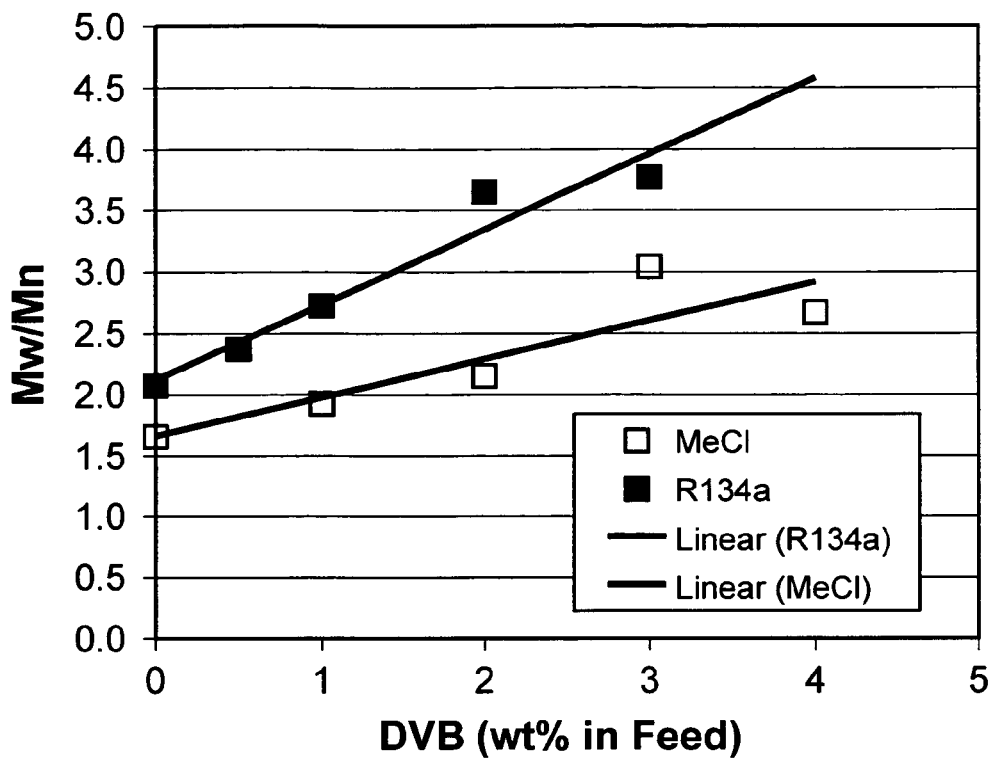
FIG. 3 graphically compares the molecular weight broadening in terms of polydispersity (Mw/Mn) as a function of DVB in the monomer feed for isobutylene-p-methylstyrene copolymerization in 1,1,1,2-tetrafluoroethane (R134a) versus copolymerization in methyl chloride (MeCl).
Figure 4:
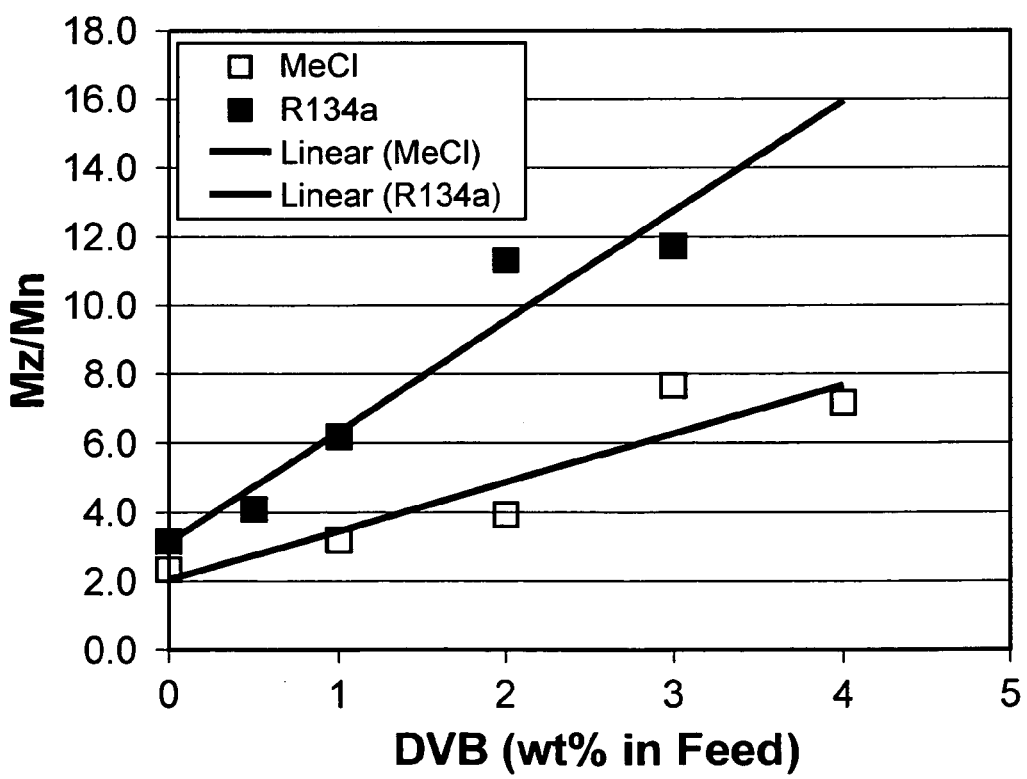
FIG. 4 graphically compares the molecular weight broadening in terms of Mz/Mn as a function of DVB in the monomer feed for isobutylene-p-methylstyrene copolymerization in 1,1,1,2-tetrafluoroethane (R134a) versus copolymerization in MeCl.

The broadening of molecular weight distributions resulting from using fluorinated hydrocarbon solvent for polymerization (Examples 19-22) versus chlorinated hydrocarbon solvent (Examples 15-18) is illustrated graphically in FIG. 3 (Mw/Mn) and FIG. 4 (Mz/Mn). These examples illustrate that the molecular weight distribution can be further broadened by polymerization in the presence of a fluorinated hydrocarbon solvent. The resulting elastomer can have further improved green strength and even faster relaxation times, better dispersion of clay particles in a nanocomposite, and better air barrier properties. Further the elastomer can be used in a blend with a narrow-MWD elastomer to improve the balance of the blend properties. Where the elastomer includes styrenic vinyl groups, it can also be radically cured or co-cured in a blend with another elastomer that is radically curable.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

When numerical lower limits and numerical upper limits are listed herein, ranges from any lower limit to any upper limit are contemplated.

While a number of theories or theoretical aspects have been presented and discussed, the present invention is neither limited nor intended to be limited by any particular theory cited or discussed herein. The theories are intended only for easier understanding and better appreciation of the disclosed invention. Similarly, the examples are intended for illustration purposes only. The theories and the examples should not be

TABLE 5

Conditions and Results for Examples 19-22

| | Example | | | | |
|---|---|---|---|---|---|
| | Comp. 6 | 19 | 20 | 21 | 22 |
| Solvent | 1,1,1,2-tetra-fluoroethane | 1,1,1,2-tetra-fluoroethane | 1,1,1,2-tetra-fluoroethane | 1,1,1,2-tetra-fluoroethane | 1,1,1,2-tetra-fluoroethane |
| Monomer Proportions | | | | | |
| Isobutylene (wt %) | 86.4 | 86.4 | 86.4 | 86.4 | 86.4 |
| PMS (wt %) | 13.6 | 13.6 | 13.6 | 13.6 | 13.6 |
| Divinylbenzene (phm) | 0 | 1 | 2 | 3 | 4 |
| Diisobutylene (phm) | 1 | 1 | 1 | 1 | 1 |
| Yield (g) | 5.9 | 6.2 | 5.9 | 6.8 | 6.6 |
| Monomer Conversion (%) | 17.81 | 18.71 | 17.81 | 20.52 | 19.92 |
| GPC Analysis | | | | | |
| $M_n/1000$ | 69 | 64.4 | 69.7 | 68.4 | 75.2 |
| $M_w/1000$ | 142.8 | 152.9 | 190.2 | 249.9 | 283.8 |
| $M_z/1000$ | 217 | 263.3 | 431.4 | 774.4 | 880.9 |
| MWD ($M_w/M_n$) | 2.07 | 2.31 | 2.73 | 3.65 | 3.77 |
| $M_z/M_n$ | 3.14 | 4.09 | 6.19 | 11.32 | 11.11 |
| GPC-3D (g' viscosity average) | 1.01 | 0.96 | 0.83 | 0.76 | 0.66 |

We claim:

1. An elastomer comprising:
   a branched interpolymer of mixed monomers comprising an isoolefin monomer, a styrenic monomer and a multi-olefin monomer having at least two non-conjugated carbon-carbon double bonds,
   the elastomer having a polydispersity (Mw/Mn) greater than 2.5.

2. The elastomer of claim 1 wherein the isoolefin monomer comprises a $C_4$ to $C_7$ isoolefin.

3. The elastomer of claim 1 wherein the isoolefin monomer comprises isobutylene, 2-methyl-1-butene, 3-methyl-1-butene, 2-methyl-2-butene, 4-methyl1-pentene, or a mixture thereof.

4. The elastomer of claim 1 wherein the isoolefin comprises isobutylene.

5. The elastomer of claim 1 wherein the styrenic monomer comprises p-alkyl styrene.

6. The elastomer of claim 1 wherein the styrenic monomer comprises p-methylstyrene.

7. The elastomer of claim 6 wherein a portion of the p-methylstyrene groups are halogenated.

8. The elastomer of claim 7 comprising from 80 to 99.5 weight percent of the isoolefin, from 0.5 to 20 weight percent of the p-methylstyrene, from 0.1 to 10 mole percent p-halomethylstyrene, and from 0.1 to 5 weight percent of the multiolefin monomer, wherein the weight percentages are based on the total weight of interpolymerized isoolefin and p-methylstyrene without regard to said halogenation thereof and the mole percentages are based on the mole of monomers.

9. The elastomer of claim 1 wherein the monomer mixture is essentially free of conjugated diene and β-pinene.

10. The elastomer of claim 1 wherein the multiolefin monomer comprises an alkyl substituted α-ωdiene.

11. The elastomer of claim 10 wherein the alkyl substituent comprises a $C_1$ to $C_3$ alkyl or branched chain alkyl.

12. The elastomer of claim 1 wherein the multiolefin monomer comprises divinylbenzene, divinyltoluene, divinylxylene, or a $C_1$ to $C_3$ alkyl or branched chain alkyl substituted derivative thereof.

13. The elastomer of claim 12 comprising a silicon-containing moiety chemically bound to a multiolefin monomer unit.

14. The elastomer of claim 12 comprising from 0.01 to 2.0 mole percent styrenic vinyl, wherein the mole percentages are based on the mole of monomers.

15. The elastomer of claim 12 comprising from 0.2 to 1.0 mole percent styrenic vinyl, wherein the mole percentages are based on the mole of monomers.

16. The elastomer of claim 1 comprising an Mw from 100,000 to 800,000.

17. The elastomer of claim 1 comprising an Mw from 200,000 to 700,000.

18. The elastomer of claim 1 comprising an Mn from 50,000 to 500,000.

19. The elastomer of claim 1 wherein the polydispersity (Mw/Mn) is greater than 3.

20. The elastomer of claim 1 wherein the polydispersity (Mw/Mn) is greater than 3.5.

21. The elastomer of claim 1 comprising an Mz/Mn greater than 3.

22. The elastomer of claim 1 comprising an Mz/Mn greater than 6.

23. The elastomer of claim 1 comprising an Mz/Mn greater than 10.

24. The elastomer of claim 1 comprising a viscosity average chain branching index (g') less than 0.978.

25. The elastomer of claim 1 comprising a filler.

26. The elastomer of claim 1 comprising intercalated clay particles dispersed therein to form a nanocomposite.

27. The elastomer of claim 1 comprising a blend component selected from the group consisting of rubber processing oils, plasticizers, and mixtures thereof.

28. The elastomer of claim 1 further comprising a curative.

29. A vulcanized composition prepared by curing the elastomer of claim 1.

30. A vulcanized composition prepared by curing the elastomer of claim 12.

31. The elastomer of claim 1 comprising from 0.01 to 2.0 mole percent styrenic vinyl, wherein the mole percentages are based on the mole of monomers.

32. The elastomer of claim 1 comprising from 0.2 to 1.0 mole percent styrenic vinyl, wherein the mole percentages are based on the mole of monomers.

33. A vulcanized composition prepared by free-radically curing the elastomer of claim 31.

34. The vulcanized composition of claim 33 wherein the elastomer is essentially free of backbone unsaturation.

35. The elastomeric composition of claim 1, wherein the elastomer is further comprised of a second elastomer comprising an essentially linear isoolefin-p-alkylstyrene copolymer having a polydispersity (Mw/Mn) less than 2.5.

36. The elastomer composition of claim 35 wherein the isoolefin in the branched interpolymer and the second elastomer is the same or different and selected from $C_4$ to $C_7$ isoolefins.

37. The elastomer composition of claim 35 wherein the isoolefin in the branched interpolymer and second elastomer is the same or different and is selected from isobutylene, 2-methyl-1-butene, 3-methyl-1-butene, 2-methyl2-butene, 4-methyl-1-pentene, and a mixture thereof.

38. The elastomer composition of claim 35 wherein the isoolefin in the branched interpolymer and the second elastomer comprises isobutylene.

39. The elastomer composition of claim 35 wherein the multiolefin in the branched interpolymer elastomer comprises vinyl-substituted aromatic.

40. The elastomer composition of claim 35 wherein the multiolefin in the branched interpolymer comprises an alkyl substituted α-ωdiene.

41. The elastomer composition of claim 35 wherein the multiolefin in the branched interpolymer comprises divinylbenzene, divinyltoluene, divinylxylene, or a $C_1$ to $C_3$ alkyl or branched chain alkyl substituted derivative thereof.

42. The elastomer composition of claim 35 wherein the multiolefin in the branched interpolymer comprises divinylbenzene.

43. The elastomer composition of claim 35 wherein the branched interpolymer comprises reactive styrenic vinyl.

44. The elastomer composition of claim 35 wherein the p-alkylstyrene in the second elastomer and the styrenic monomer in the branched interpolymer comprises p-methylstyrene.

45. The elastomer composition of claim 44 wherein a portion of the p-methylstyrene groups are halogenated in the branched interpolymer, in the second elastomer or in a combination thereof.

46. The elastomer composition of claim 45 wherein:
   (a) the second elastomer comprises from 80 to 99.5 weight percent isobutylene, from 0.5 to 20 weight percent of the p-methylstyrene, and from 0.1 to 10 mole percent brominated p-methylstyrene; and (b) the branched interpolymer elastomer comprises from 80 to 99.5 weight percent isobutylene, from 0.5 to 20 weight percent of the p-methylstyrene, optionally from 0.1 to 10 mole percent brominated p-methylstyrene, and from 0.1 to 5 weight percent of the multiolefin, wherein the weight percentages are based on the total weight of isobutylene and p-methylstyrene in the respective branched interpolymer and second elastomer without regard to any bromination thereof and the mole percentages are based on the mole of monomers.

47. The elastomer composition of claim 46 wherein the second elastomer has a Mooney viscosity less than 45.

48. The elastomer composition of claim 46 wherein the second elastomer has a Mooney viscosity less than 40.

49. The elastomer composition of claim 46 wherein the second elastomer has a Mooney viscosity less than 35.

50. The elastomer composition of claim 46 wherein the second elastomer has a Mooney viscosity less than 30.

51. The elastomer composition of claim 46 wherein the branched interpolymer has an Mw of at least 300,000.

52. The elastomer composition of claim 46 wherein the branched interpolymer has an Mw of at least 400,000.

53. The elastomer composition of claim 46 wherein the branched interpolymer has an Mw of at least 500,000.

54. The elastomer composition of claim 46 wherein the branched interpolymer has an Mz/Mn greater than 1.5.

55. The elastomer composition of claim 46 wherein the branched interpolymer has an Mz/Mn greater than 1.7.

56. The elastomer composition of claim 46 wherein the branched interpolymer has an Mz/Mn greater than 2.

57. The elastomer composition of claim 46 comprising from 1 to 50 phr of the branched interpolymer.

58. The elastomer composition of claim 46 comprising from 5 to 40 phr of the branched interpolymer.

59. The elastomer composition of claim 46 comprising from 10 to 30 phr of the branched interpolymer.

60. The elastomer composition of claim 35 wherein the branched interpolymer is prepared by a process comprising contacting the isoolefin, the p-alkylstyrene and the multiolefin in a reactor with one or more initiators in a diluent, wherein the diluent comprises one or more fluorinated hydrocarbons in an amount effective to increase the polydispersity (Mw/Mn).

61. The elastomer composition of claim 60 wherein the one or more fluorinated hydrocarbons are selected from fluorinated hydrocarbons having from 1 to 3 carbon atoms.

62. The elastomer composition of claim 35 further comprising intercalated clay.

63. The elastomer composition of claim 62 wherein the clay is an organoclay.

64. The elastomer composition of claim 62 wherein the clay is an inorganic clay.

65. The elastomer composition of claim 62 wherein the clay comprises a silicate.

66. The elastomer composition of claim 62 wherein the clay comprises smectite clay.

67. The elastomer composition of claim 62 wherein the smectite clay comprises montmorillonite, nontronite, beidellite, bentonite, volkonskoite, laponite, hectorite, saponite, sauconite, magadite, kenyaite, stevensite, vermiculite, halloysite, hydrotalcite, or a combination thereof.

68. The elastomer composition of claim 62 wherein the smectite clay comprises montmorillonite, bentonite, vermiculite, or a combination thereof.

69. The elastomer composition of claim 35 further comprising filler selected from calcium carbonate, mica, silica, (large-particle) silicates, talc, titanium dioxide, carbon black, and mixtures thereof.

70. The elastomer composition of claim 35 further comprising dye, pigment, antioxidant, heat and light stabilizer, plasticizer, oil, or a mixture thereof.

71. The elastomer composition of claim 62 further comprising organic peroxide, zinc oxide, zinc stearate, stearic acid, an accelerator, a vulcanizing agent, or a mixture thereof.

* * * * *